United States Patent [19]

Grahn

[11] Patent Number: 5,209,126

[45] Date of Patent: May 11, 1993

[54] FORCE SENSOR

[75] Inventor: Allen R. Grahn, Salt Lake City, Utah

[73] Assignee: Bonneville Scientific, Salt Lake City, Utah

[21] Appl. No.: 638,044

[22] Filed: Jan. 4, 1991

[51] Int. Cl.[5] .............................................. G01L 5/16
[52] U.S. Cl. .............................. 73/862.046; 73/862.68
[58] Field of Search ............. 73/862.04, 862.68, 865.7, 73/597; 310/338, 366, 800, 364, 365

[56] References Cited

U.S. PATENT DOCUMENTS

| 3,487,239 | 12/1969 | Schafft ............................ 310/369 X |
| 3,590,287 | 6/1971 | Berlincourt et al. ................ 310/321 |
| 3,904,274 | 9/1975 | Feinleib et al. ................. 310/366 X |
| 4,547,668 | 10/1985 | Tsikes ........................... 73/862.04 X |
| 4,555,953 | 12/1985 | Dario et al. ...................... 73/862.04 |
| 4,634,917 | 1/1987 | Dvorsky et al. ................. 310/338 X |
| 4,651,310 | 3/1987 | Kaneko et al. .................. 310/366 X |
| 4,704,909 | 11/1987 | Grahn et al. ...................... 73/862.04 |
| 4,964,302 | 10/1990 | Grahn et al. ................. 73/862.04 X |

FOREIGN PATENT DOCUMENTS 0168028  8/1985  Japan ................................ 73/862.04

Primary Examiner—Michael T. Razavi
Assistant Examiner—Elizabeth L. Shopbell
Attorney, Agent, or Firm—Jon C. Christiansen

[57] ABSTRACT

A force sensor and related method for determining force components. The force sensor includes a deformable medium having a contact surface against which a force can be applied, a signal generator for generating signals that travel through the deformable medium to the contact surface, a signal receptor for receiving the signal reflected from the contact surface, a generation controller, a reception controller, and a force determination apparatus. The signal generator has one or more signal generation regions for generating the signals. The generation controller selects and activates the signal generation regions. The signal receptor has one or more signal reception regions for receiving signals and for generating detections signals in response thereto. The reception controller selects signal reception regions and detects the detection signals. The force determination apparatus measures signal transit time by timing activation and detection and, optionally, determines force components for selected cross-field intersections. The timer which times by activation and detection can be any means for measuring signal transit time. A cross-field intersection is defined by the overlap of a signal generation region and a signal reception region.

46 Claims, 10 Drawing Sheets

FORCE SENSOR

INTRODUCTION

This invention was made with Government support under SBIR Phase I contract No. DE-AC02-85ER80291 awarded by the Department of Energy and SBIR Phase I contract No. F41622-89-C-1027 awarded by the U.S. Air Force. The Government has certain rights in this invention In many industrial, medical, scientific and other applications, it is necessary to have adequate, versatile, and reliable low-cost sensory systems to accomplish various desired tasks. For example, force sensors have applications in measuring foot force distribution. Foot force distributions can be used to analyze advancements in athletic training, sports injuries, high pressure points due to diabetic neuropathy, and podiatric disorders. In the ergonomic design of chairs, car seats and mattresses, force sensors can be used to indicate the location and magnitude of large forces that would cause discomfort.

In the scientific study of dexterous manipulation by mechanical hands, force sensors on the fingers and palm are essential for indicating the location and magnitude of contact forces. Force sensors used to indicate the force distribution on mechanical hands are commonly called tactile sensors In the field of industrial robotics, technology now exists to permit the design of robots able to appropriately respond to the force information provided by tactile sensors However, tactile sensors often produce unreliable measurements and lack ruggedness. Tactile sensors can complement other robotic systems by controlling the robot at the time contact is made between the robot's hand and the object being grasped. Reliable and versatile tactile sensors enable a robot to function in a manner comparable to the way a person feels an object. This enables a robot to perform tasks such as placing parts into specific locations.

One type of force sensor uses an ultrasonic transducer with a deformable medium to determine force components. See U.S. Pat. No. 4,964,302 entitled "Sensor" issued Oct. 23, 1990. An ultrasonic transducer that both transmits and detects a signal is used to transmit a signal through a deformable medium and to detect the echo of the signal from the face of the deformable medium. When a force is applied to the deformable medium, the distance the signal must travel is changed. The time differential between generation of the signal and detection of the echo is used for determining the applied force.

Another type of force sensor uses an ultrasonic transducer with a deformable medium to determine force torque components. See U.S. Pat. No. 4,704,909 entitled "Multicomponent Force Torque Sensor" issued Nov. 10, 1987. A plurality of signal-generation means creates a plurality of signals that are transmitted through a deformable medium, and the echoes of the signals from the face of a loadable means are detected with a plurality of signal reception means. The time differential between generation of the signals and detection of the signals is used for determining a plurality of force-torque components.

The previous "Sensor" invention (U.S. Pat. No. 4,964,302) uses cross-point switching, as shown in FIG. 1 (which depicts a 3×3 array), to detect and quantify a force applied normal to the surface of the sensor. In cross-point switching, an ultrasonic transducer both transmits and detects a signal. Conventional force sensor arrays may require a wire for each sensing element to exit the sensor assembly. The greater the number of sensing elements, the greater the number of required wires. Cross-point switching allows the number of external wires to be reduced. An array using cross-point switching with sensing elements arranged in N rows and M columns may have N+M wires versus a wire for each sensing element (i.e. N×M wires). However, in practice, cross-point switching was found to be practical for arrays with only a small number of rows and columns. In FIG. 1, row selection means 80 selects a row from rows and column selection means 81 selects a column from columns 84.

Capacitance between adjacent rows and adjacent columns, and capacitance to ground through the sensor electronics, causes spurious coupling of the excitation voltage to more than just the selected sensing element. Such spurious coupling creates a signal of reduced amplitude from the selected sensing element, and erroneous signals from nonselected sensing elements.

In a similar fashion, the echo signal is also spuriously coupled to more than one sensing element. After the selected sensing element signal and erroneous spuriously coupled signals are generated, they are reflected back from the surface of the tactile sensor. The erroneous signals create a large echo that can mask the smaller echo of the selected sensing element. To extract the desired echo, extensive mathematical processing of each sensing element's signal is required to isolate it from the effect of its neighbors. This deleterious effect becomes greater as the number of rows and columns increases.

The present invention concerns itself with an apparatus and process that uses cross-field switching, as shown in FIG. 2. In cross-field switching, the signal generation (excitation) means and signal reception means are electrically isolated. Cross-field switching also allows the number of external wires to be reduced. An array using cross-field switching with sensing elements arranged in N rows and M columns may have N+M wires versus a wire for each sensing element (i.e. N×M wires). In FIG. 2, row selection means 85 selects a row from rows 87 and column selection means 86 selects a column from columns 88.

The present invention utilizes cross-field switching rather than cross-point switching. Cross-field switching can use row-column sensing elements. The signal generation means and the signal reception means can be, for example, electrically isolated ultrasonic transducers. By activating a particular row of the signal generation means, and by receiving the signal from one particular column of the signal reception means, signals are only received from objects directly above the cross-field intersection common to the overlapping signal generation region and signal reception region. This cross-field switching avoids the problem of parasitically exciting additional sensing elements with the transmitted signal. In addition, cross-field switching avoids the problem of spurious coupling of the received signal among sensing elements.

Since the excitation and reception electronics of cross-field switching, as shown in FIG. 2, are electrically isolated, echoes can be detected sooner; thus allowing the use of a thinner deformable medium. The separate generation and reception of a signal allows for a quicker response time because the reception means is not overloaded during activation of the signal generation means. Other objects and features of the invention will become apparent from the following description.

SUMMARY OF THE INVENTION

The force sensor of this invention has a deformable medium with a contact surface to which a force can be applied. The deformable medium should have known mechanical and speed of sound characteristics. The deformable medium can be an elastomeric material such as rubber. Preferably, the deformable medium is an elastomeric, resilient material such as urethane rubber, natural rubber, silicone rubber, etc. When a force is applied, the deformable medium changes in thickness. The deformable medium may also have a metal layer which can serve as the contact surface by being located between the deformable medium and the applied force. The deformable medium may be in any size or dimension suitable for the applications to which the sensor will be applied.

The force sensor further includes a signal generator. The signal generator has one or more signal generation regions. A plurality of signal generation regions is preferred. A signal generation region can be any means for generating a signal that travels through the deformable medium and is reflected by the contact surface to a signal reception region. Preferably, a signal generation region is an ultrasonic transducer capable of generating an acoustic signal.

It is possible to have multiple signal generation strata. Signal generation strata can be stacked and/or interleaved. Each signal generation stratum has at least one signal generation region and preferably a plurality of signal generation regions. A signal generation region in one stratum should overlap with a signal generation region in each of the other signal generation strata. The overlapping signal generation regions are, preferably, acoustically in series so that the additional transducer material creates a more powerful acoustic signal.

The force sensor further includes a signal receptor. The signal receptor has one or more signal reception regions. A plurality of signal reception regions is preferred. A signal reception region can be any means for receiving a signal generated by a signal generation region and for generating a detection signal in response thereto. Preferably, a signal reception region is an ultrasonic transducer capable of receiving an acoustic signal and transforming the acoustic signal into an electrical signal which serves as the detection signal.

It is possible to have multiple signal reception strata. Signal reception strata can be stacked and/or interleaved. Each signal reception stratum has at least one signal reception region and preferably a plurality of signal reception regions. A signal reception region of one stratum should overlap with a signed reception region in each of the other signal reception strata. The overlapping signal reception regions are, preferably, acoustically in series so that the additional transducer material creates a more sensitive receptor.

The overlap of a signal generation region and a signal reception region defines a cross-field intersection. Although the signal generation region and signal reception region may not literally intersect, for the purposes of this disclosure and the claims this overlap will be referred to as a cross-field intersection. Preferably, the signal generation regions perpendicularly overlap the signal reception regions to form the cross-field intersections.

The signal generation regions and signal reception regions can overlap to form various patterns of cross-field intersections. By activating a signal generation region to generate a signal and by receiving the signal at a signal reception region a cross-field intersection is used and the spurious coupling problems of cross-point switching can be avoided. The separate generation and reception of a signal allows for a quicker response time since the reception means doesn't need to recover before reception can take place.

Preferably, the force sensor includes a substrate which can be any means for supporting the deformable medium, the signal-generator and the signal receptor. The substrate can consist of a rigid material (such as ceramic, steel, aluminum, etc.) or a flexible material (such as Kapton) to provide direct support.

The force sensor further includes a generation control means for selecting and activating the signal generation regions. Preferably, a single pulse generator is connected by switches to the desired signal generation region. Once connected, the pulse generator is triggered to produce an electrical pulse which activates the selected signal generation region. In an alternative embodiment, each signal generation region is connected to a separate pulse generator. To energize the desired signal generation region, the corresponding pulse generator is triggered. Conventional analog and digital circuits can be used for the switches and pulse generators.

The force sensor further includes a reception control means for selecting signal reception regions and detecting detection signals generated by the signal reception regions. The reception control means can operate as a switch that decodes which signal reception region is to be selected and received from. Preferably, a single signal detector is connected by switches to the desired signal reception region. In alternative embodiments, separate signal detectors can be connected to each signal reception region. To detect the signal from the desired signal reception region, the output of the corresponding signal detector is selected. Conventional analog circuits can be used for the switches and detectors. Detection can be accomplished with conventional amplitude detection or phase detection circuitry.

The force sensor includes a force determination means for determining force components. The transit time of a signal generated by the signal generation region and transmitted to the signal reception region by reflection from the contact surface can be measured using a conventional electronic timer. When the signal generation region is activated by the generation control means a timer in the force determination means begins to count. Detection of the detection signal by the reception control means stops the counter. The time interval measured by the timer is equal to the transit time of the acoustic signal. This is an example of how signal transit time can be measured by the force determination means by timing activation by the generation control means and detection by the reception control means. Other methods for timing activation and detection are also within the scope of this intention. Furthermore, in alternative embodiments of the invention, conventional phase detection circuitry can be used to measure the phase of the detection signal, which is related to the signal transit time of the acoustic signal. This and other alternatives are deemed to be equivalents which are deemed to constitute the measurement of signal transit time and which are within the scope of the invention as claimed.

The transit time of a signal is proportional to the distance a signal must travel from the signal generation region to the contact surface of the deformable medium and then to the signal reception region. Alteration of this distance by a force applied to the deformable medium results in the alteration of the transit time of the signal.

The force determination means can be any means for measuring the transit time of the signal. The critical component of the force determination means is the means for measuring such transit time. In many cases, the applied force component is simply proportional to the change in this transit time and, therefore, conversion from such change in transit time to force is trivial because it can be calculated by multiplication with a constant. The force determination means can, optionally, also include a means for determining a force component for a selected cross-field intersection (i.e. any intersection of a signal generation region with a signal reception region). The change in the signal transit times produced by an applied force can be used by the force determination means to calculate the force component F. The sensor can be calibrated by measuring and storing the signal transit time for each cross-field intersection when no forces are applied to the contact surface of the deformable medium. For acoustic signals, a force component F for a particular cross-field intersection can be given by $F = \frac{1}{2} kc (t_1 - t_2)$ as more fully described below.

The generation control means activates a signal generation region by causing the signal generation region to generate a signal. This signal travels through the deformable medium, is reflected back from the contact surface of the deformable medium to a signal reception region. Signal reception regions react to the reflected signal and generate a detection signal for the reception control means. The reception control means selects a signal reception region and detects the detection signal.

If the contact surface of the deformable medium contacts a medium with a lower acoustic impedance (such as air), the transmitted signal undergoes a 180 degree phase shift upon reflection at the surface. If the contact surface of the deformable medium contacts a medium with a higher acoustic impedance (such as metal), the signal is reflected without a phase reversal.

By selecting a particular signal generation region for activation and by selecting a particular signal reception region, signals are only received from objects directly above the cross-field intersection common to the overlapping signal generation region and signal reception region. This cross-field switching avoids the problem of parasitically exciting additional sensing elements with the transmitted signal. In addition, this cross-field switching avoids the problem of spurious coupling of the received signal among additional sensing elements.

Once the detection signal is detected by the reception control means, the transit time of a signal from the signal generation region to the selected signal reception region can be measured using conventional time measurement or phase detection electronic circuitry. The transit time of a signal is proportional to the distance a signal must travel from the signal generation region to the contact surface of the deformable medium and then to the signal reception region.

Alteration of the deformable medium by an applied force results in the alteration of the transit time of a signal for a cross-field intersection. By measuring the signal transit time for each cross-field intersection, the perpendicular force components applied to the surface of the force sensor by an object can be determined. The force applied to the deformable medium can be represented as a distribution of force components over the contact surface of the deformable medium. Thus, a force component is a force applicable to a cross-field intersection. Cross-field intersections can be selected in turn to determine a plurality of force components over the contact surface. This gives a picture of the distribution of force components over the contact surface. Over time, the force component applicable to a given cross-field intersection can change. An individual (i.e. a given) cross-field intersection can be repeatedly selected and force components therefor repeatedly determined to measure force component changes over time.

Figure 1:
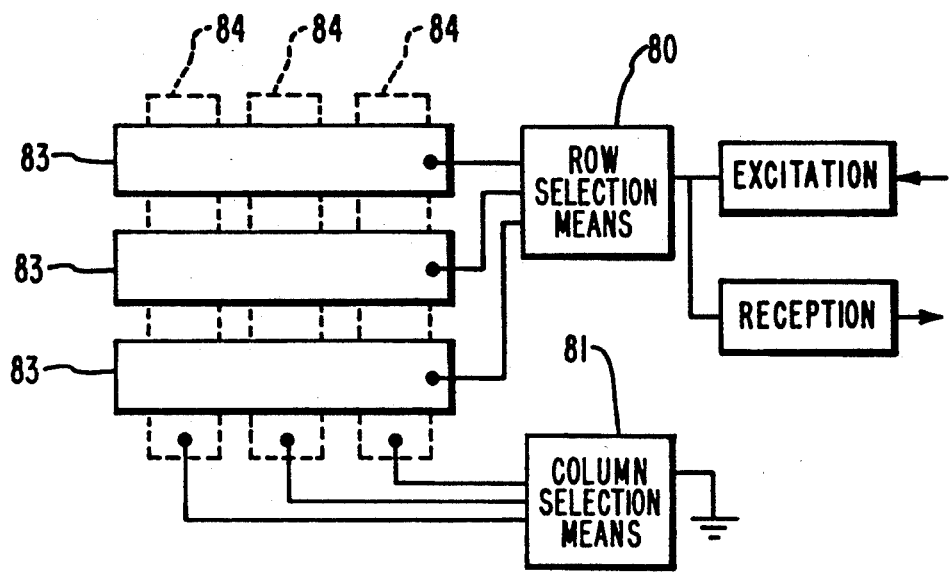
FIG. 1 depicts a conceptual view of cross-point switching.
Figure 2:
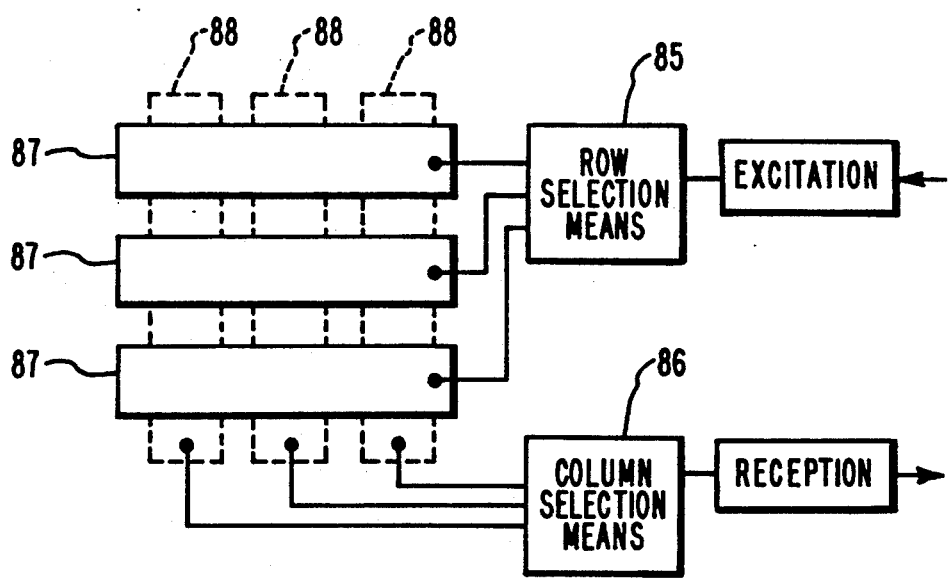
FIG. 2 depicts a conceptual view of cross-field switching.

It should be noted that relative dimensions in the drawings have been distorted to facilitate viewing and presentation.

DETAILED DISCLOSURE OF THE INVENTION

Figure 3:
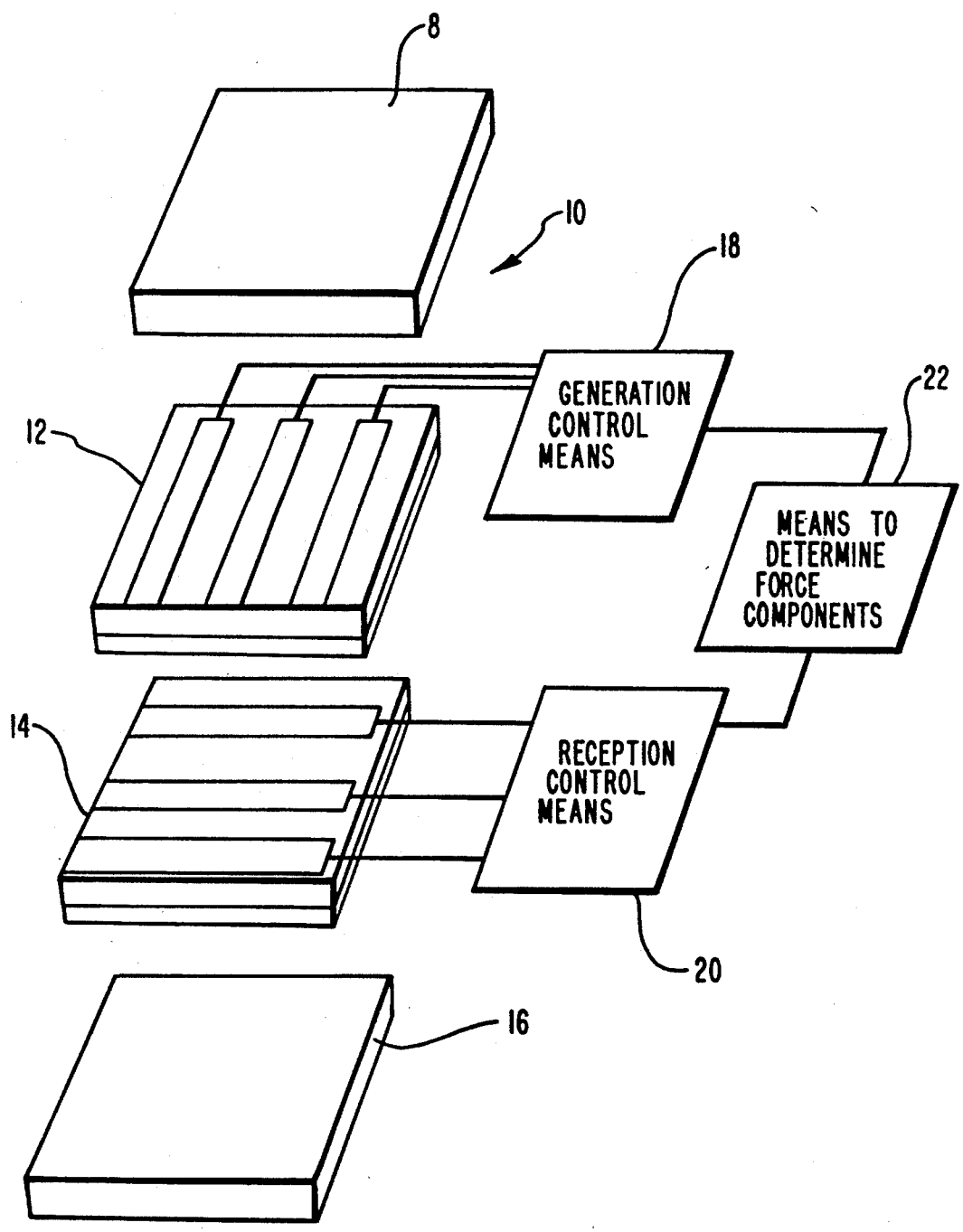
FIG. 3 depicts a force sensor.

The force sensor of this invention includes a deformable medium 10, with contact surface 8, as shown in FIG. 3. Contact surface 8 is the surface against which a force is applied. In addition, the sensor includes a signal generator in the form of a signal generation stratum 12 that generates acoustic signals. In other embodiments of the invention other kinds of signals (e.g. optical signal, etc.) can be used in place of acoustic signals. The signal generator 12 is activated by electronic pulses from generation control means 18, as shown in FIG. 3. The acoustic signals generated by signal generator 12 travel through deformable medium 10 and are reflected back from contact surface 8.

The sensor further includes a signal receptor in the form of a signal reception stratum 14, that receives the reflected acoustic signals. Signal reception stratum 14 transforms the reflected acoustic signals into electrical signals which serve as detection signals. Signal reception stratum 14 is controlled by reception control means 20, as shown in FIG. 3. Force determination means 22 determines applied forces by measuring the transit time of the acoustic signals and calculating force components based thereon.

A substrate 16 as shown in FIG. 3, supports the deformable medium 10, the signal generator 12, and the signal receptor 14.

Deformable medium 10 as shown in FIG. 3, should have known mechanical and speed of sound characteristics. Preferably, deformable medium 10 is a sheet of urethane rubber (or other elastomeric and resilient material such as natural rubber, elastomers, silicone rubber, etc.) The thickness of the deformable medium in this embodiment of the invention typically ranges from about 0.040 inches or less to about 1.0 inch or more. The size ranges from about 0.020 inches by 0.020 inches or less to about 3 feet by 3 feet or more. The deformable medium 10 may be in any shape, size or dimensions suitable for the applications to which the sensor will be applied.

One side of the deformable medium 10 is a contact surface 8 against which a force can be applied. The other side of the deformable medium can be coated with Kapton tape (or other tape such as Mylar tape). Signal generation stratum 12 can be coated with Kapton tape (or other tape such as Mylar tape). The taped side of the deformable medium 10 can be bonded to the taped side of signal generation stratum 12 with urethane adhesive (or other material capable of adhesion such as epoxy, etc.). Deformable medium 10 is bonded to signal generation stratum 12 by this or other means. Deformable medium 10 can alternatively be bonded to the signal-reception stratum 14 if the positions of the signal generator 12 and signal receptor 14 ar reversed.

Figure 4:
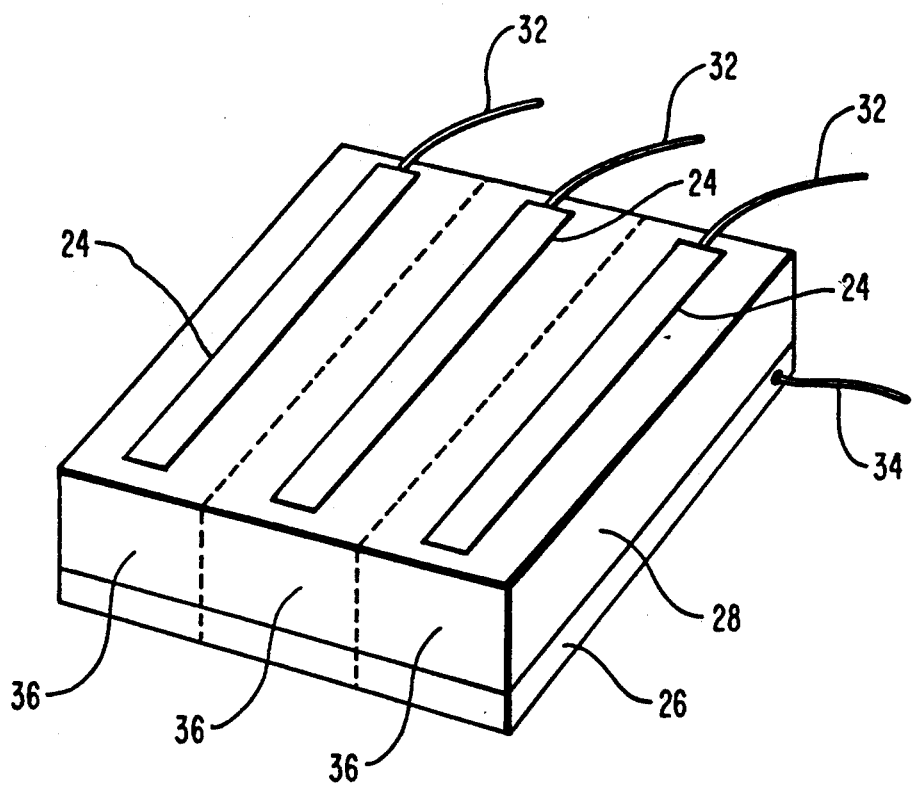
FIG. 4 depicts a signal generation stratum.
Figure 5:
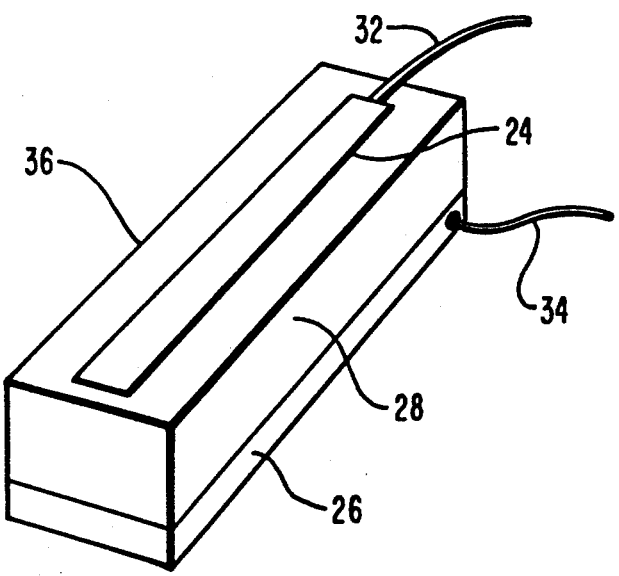
FIG. 5 depicts a signal generation region.

The signal generator 12 is comprised of signal generation regions 36, as shown in FIG. 4 and FIG. 5. In this embodiment of the invention the signal generation regions 36 are not separate units, devices, etc. that are bonded together, rather they are portions of a single integrated signal generation stratum. In alternative embodiments of this invention, the signal generation regions can be separate units, devices, or other means for generating a signal which are aligned or positioned to form a stratum. FIG. 4 shows three signal generation regions 36, however, in practice the number of signal generation regions may range from 1 to 80 or more depending on what is suitable for the applications to which the sensor is applied. A signal generation region can be any means for generating a signal which is transmitted to at least one of the signal reception regions (described below) by reflection from contact surface 8. Preferably, a signal generation region 36 is an ultrasonic transducer. The ultrasonic transducer can have the construction and form depicted in FIG. 4 and FIG. 5.

One layer 28 of a signal generation region 36 can be polyvinylidene fluoride (PVDF) (or other piezoelectric material such as poly-gamma-methyl-L-glutamate, polyacrylonitrile, polyvinyl fluoride, lead titanate-zirconate, lead metaniobate, barium titanate, etc.) Piezoelectric layer 28 is positioned between electrode 24 and isolation layer 26, as shown in FIG. 5. If the piezoelectric layer 28 is PVDF, its thickness can typically range from 6 to 1000 microns. Preferably, the PVDF thickness ranges from 9 to 52 microns thick. The size of the piezoelectric layer can typically range from about 0.020 inches by 0.020 inches or less to about 3 feet by 3 feet or more. Its shape, size and dimensions can be adapted to suit intended applications.

Electrode 24 of signal generation regions 36 can be constructed by vacuum depositing a thin film of aluminum-tin (or other material capable of performing an electrode function such as nickel, gold, etc.) on piezoelectric layer 28 and by subtracting undesired aluminum-tin from the substrate through conventional photo-etching techniques. The subtraction leaves the desired pattern of electrodes 24. Any other suitable methods of construction can be employed, such as screening of conductive inks. Electrodes 24 are connected to wires 32 as shown in FIG. 4. When an electrode 24 is activated with an electrical pulse from generation control means 18, the electrode 24 excites the portion of the piezoelectric layer 28 between the electrode 24 and the isolation layer 26 to generate an acoustic signal.

The isolation layer 26 is a metalized aluminum-tin layer (or any other material capable of conducting such as nickel, gold, etc.). Isolation layer 26 is an electrode layer that is connected to the electronics of generation-control means 18 by wire 34, as shown in FIG. 4 and FIG. 5. In this embodiment, the wire 34 is terminated to ground and thus isolation layer 26 is a ground sheet. Isolation layer 26 electrically shields the signal generation stratum 12 and signal reception stratum 14 from electrical interference. In alternative embodiments of this invention the isolation layer can be any layer that electronically isolates the signal generation regions 36 and the signal reception regions 52.

Figure 6:
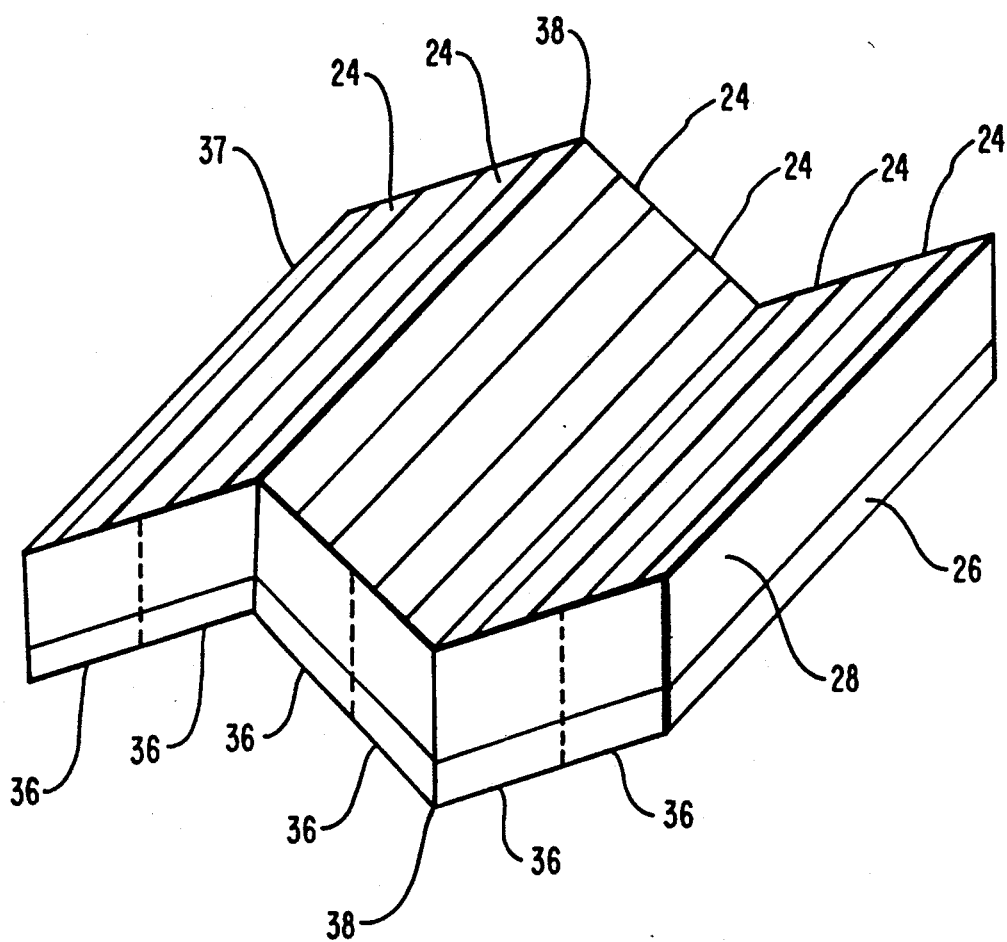
FIG. 6 depicts a folded signal generation sheet.

In FIG. 3 the signal generator 12 is a single signal generation stratum 12. Preferably, however, signal generator 12 has a plurality of signal generation strata, with each strata having at least one signal generation region and preferably a plurality of signal generation regions. One way of achieving this for flexible piezoelectric materials is by folding a signal generation sheet 37 upon itself at points 38, as shown in FIG. 6. Once folded, the sheet 37 of FIG. 6 provides three signal generation strata with each stratum having a plurality of signal generation regions 36. In this example, the signal generator 12 has a top stratum, a bottom stratum and an intermediate stratum. These strata overlap each other.

There can be many folds and many overlapping intermediate signal generation strata. Once folded, the signal generation strata should be aligned so that the electrodes of one signal generation region don't short to the electrodes of another signal generation region. The overlapping signal generation regions should be acoustically in series. Accordingly, the additional transducer material creates a more powerful acoustic signal.

Figure 7:
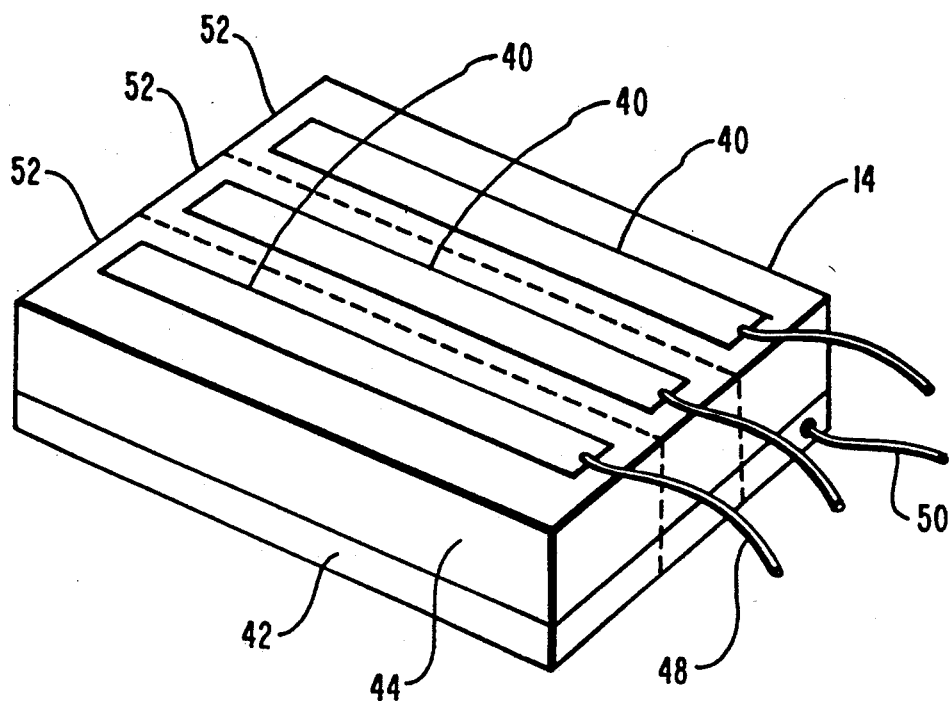
FIG. 7 depicts a signal reception stratum
Figure 8:
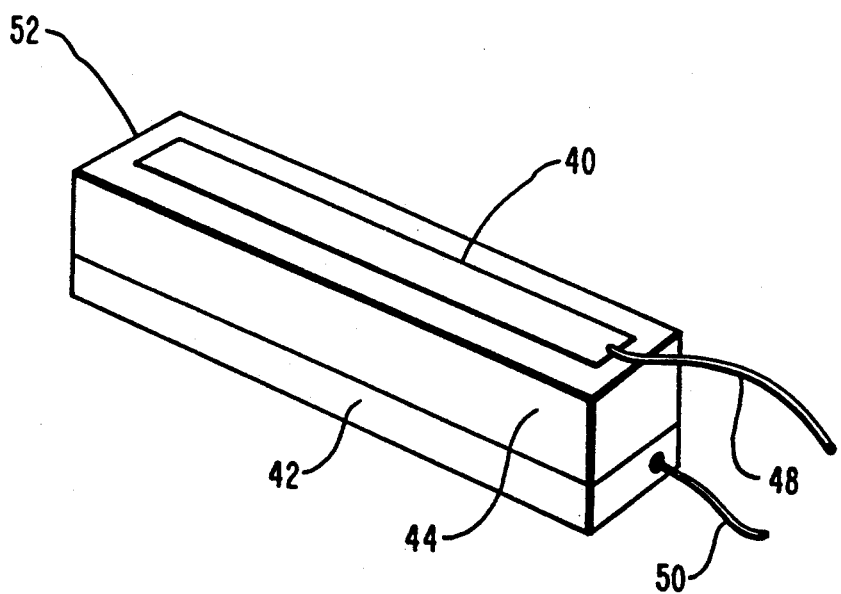
FIG. 8 depicts a signal reception region.

The force sensor includes a signal reception stratum 14, as shown in FIG. 7. Signal reception stratum 14 is comprised of signal reception regions 52, as shown in FIG. 7 and FIG. 8. In this embodiment of the invention the signal reception regions 52 are not separate units, devices, etc. that are bonded together, rather they are portions of a single, integral signal reception stratum. In alternative embodiments of this invention, the signal reception regions can be separate units, devices, or other means for receiving a signal which are aligned or positioned to form a stratum. FIG. 7 shows three signal reception regions 52, however, in practice the number of signal reception regions may range from 1 to 80 or more depending on what is suitable for the applications to which the sensor will be applied. A signal reception region can be any means for receiving a signal which has been generated by and transmitted from at least one of the signal generation regions 36 and reflected from contact surface 8, and for generating a detection signal in response to the reception of the reflected signal. Preferably, the signal reception region 52 is an ultrasonic transducer. The ultrasonic transducer can have the construction and form depicted in FIG. 7 and FIG. 8.

One layer 44 of signal reception region 52 is polyvinylidene fluoride (PVDF) (or other piezoelectric material such as poly-gamma-methyl-L-glutamate, polyacrylonitrile, polyvinyl fluoride, lead titanate-zirconate, lead metaniobate, barium titanate, etc.). Piezoelectric layer 44 is positioned between electrode 40 and isolation layer 42, as shown in FIG. 8. If the piezoelectric layer is PVDF, its thickness can typically range from 6 to 1000 microns. Preferably, the PVDF thickness ranges from 9 to 52 microns. The size of the piezoelectric layer can typically range from about 0.020 inches by 0.020 inches or less to about 3 feet by 3 feet or more. Its shape, size and dimensions can be adapted to suit intended applications.

Electrodes 40 of signal reception regions 52 can be constructed by vacuum depositing a thin film of aluminum-tin (or any other material capable of performing an electrode function such as nickel, gold, etc.) on the piezoelectric layer 44 and by subtracting undesired aluminum-tin from the substrate through conventual photo-etching techniques. The subtraction leaves the desired pattern of electrodes 40. Any other methods of construction can be employed, such as screening of conductive inks. Electrodes 40 are connected to wires 48 as shown in FIG. 7. When a signal reception region 52 receives an acoustic signal from a signal generation region 36, the portion of piezoelectric layer 44 between electrode 40 and isolation layer 42, as shown in FIG. 8, is activated by the acoustic signal and an electrical signal (the detection signal) on electrode 40 is created. In this manner, the signal reception region 52 receives the signal and generates a detection signal in response to the received signal. [Note: in this description of the invention and the claims, the detection signal should not be confused with any reference to the signal generated by the signal generation region (which in this embodiment is the acoustic signal). To avoid confusion, the detection signal is always referred to as the *detection* signal. Any other reference to a "signal" shall mean the signal generated by the signal generation region.]

Isolation layer 42 is a metalized aluminum-tin layer (or any other material capable of conducting such as nickel, gold, etc.) Isolation layer 42 is an electrode layer that is connected to the electronics of the reception control means 20 by wire 50, as shown in FIG. 7 and FIG. 8. In this embodiment, wire 50 is terminated to ground and thus isolation layer 42 is a ground sheet. Isolation layer 42 electrically shields signal generation stratum 12 and signal reception stratum 14 from sources of electrical interference. In alternative embodiments of this invention, the isolation layer can be any layer that electronically isolates the signal reception regions 52 and the signal generation regions 36.

In FIG. 3 the signal receptor 14 is a single signal reception stratum 12. Preferably, however, signal receptor 14 has a plurality of signal reception strata, with each stratum having at least one signal reception region and preferably a plurality of signal reception regions.

Figure 9:
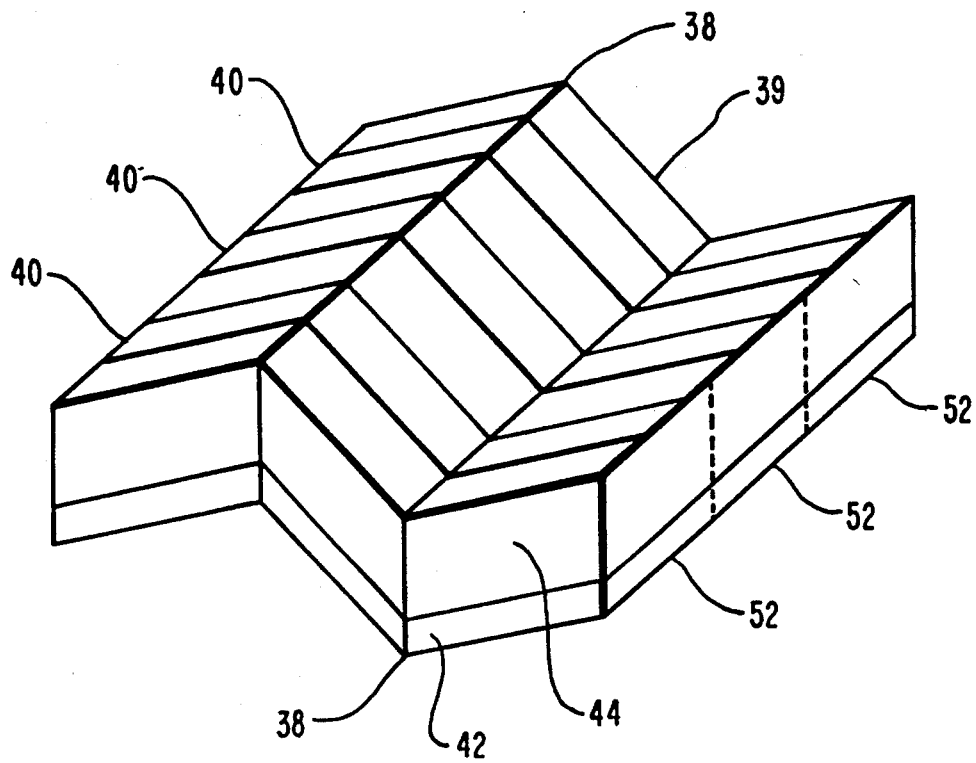
FIG. 9 depicts a folded signal-reception sheet.

One way of achieving this for flexible piezoelectric materials is by folding a signal reception sheet 39 upon itself at points 38 as shown in FIG. 9. Once folded, sheet 39 of FIG. 9, provides three signal reception strata with each stratum having a plurality of signal-reception regions 52. In this example, the signal receptor has a top stratum, a bottom stratum, and an intermediate stratum. These strata overlap each other.

There can be many folds and many overlapping intermediate signal reception strata. Once folded, the signal reception strata should be aligned so that the electrodes of one signal reception region don't short to the electrodes of another signal reception region. The overlapping signal reception regions should be acoustically in series. Accordingly, the additional transducer material creates a more sensitive acoustic signal receptor.

Figure 10:
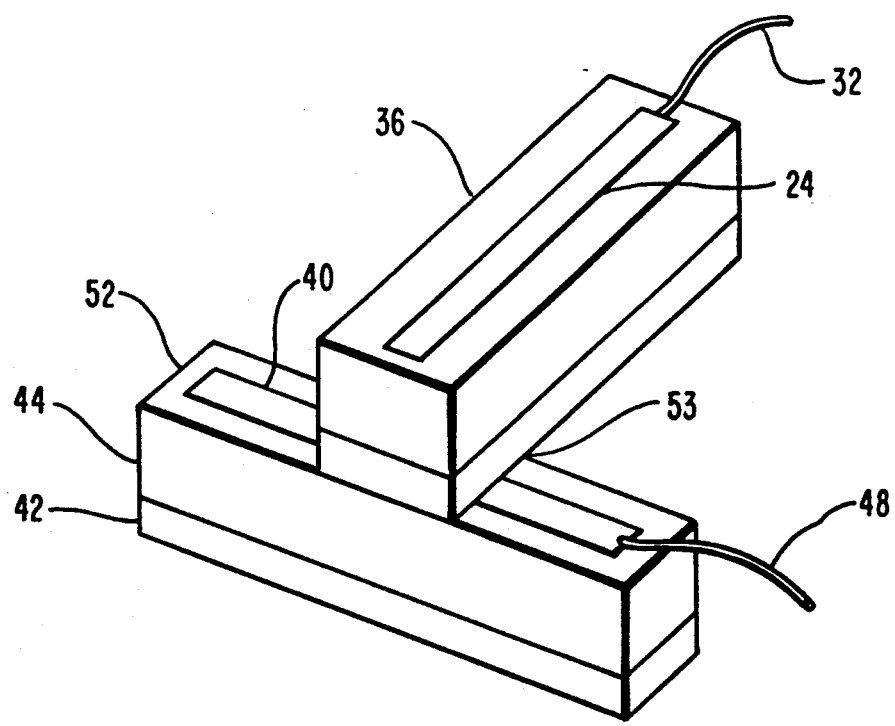
FIG. 10 depicts a cross-field intersection.
Figure 15:
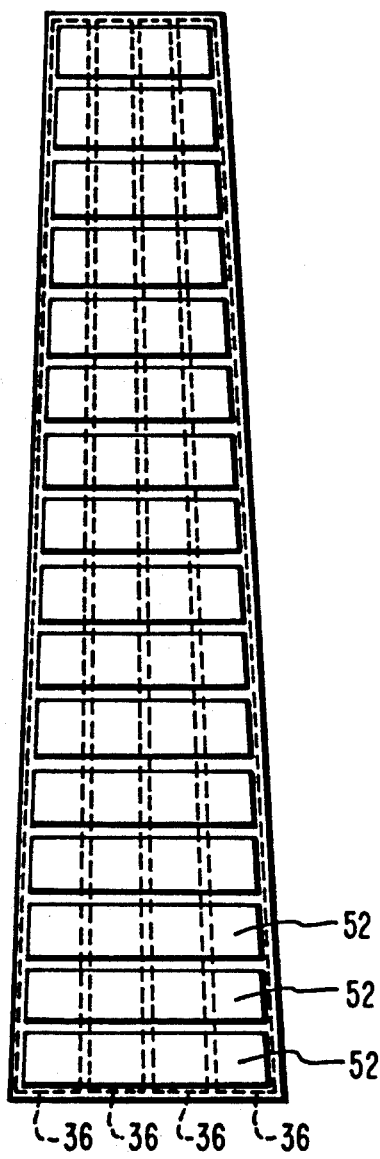
FIG. 15 depicts a force sensor array having signal generation regions which form cross-field intersections with signal reception regions.
Figure 16:
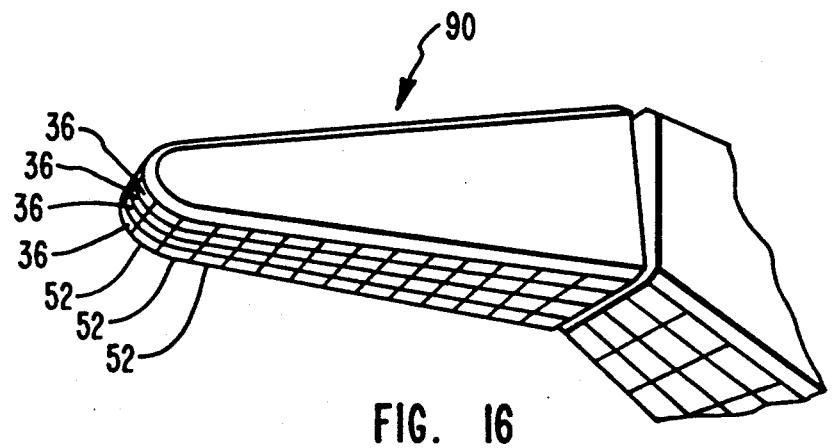
FIG. 16 depicts a robotic finger which utilizes the array of FIG. 15.
Figure 17:
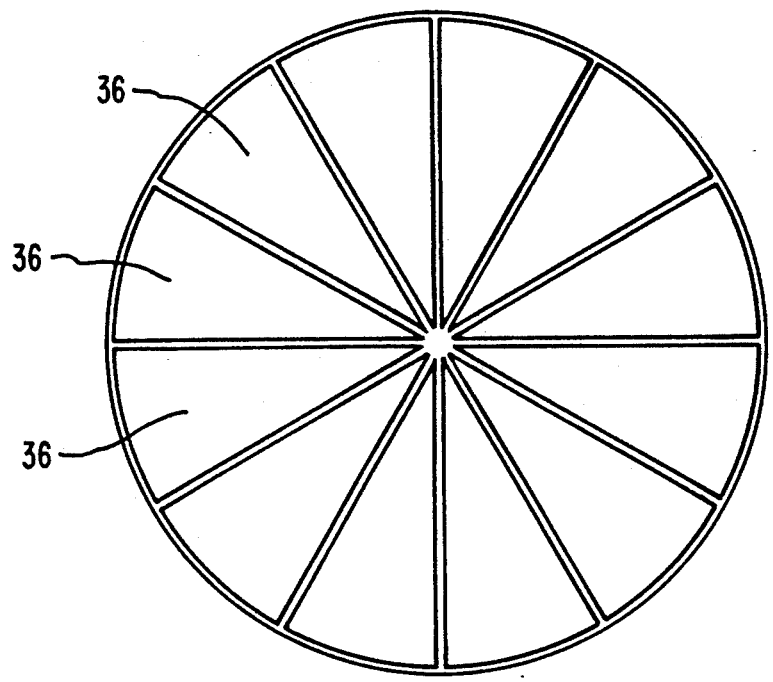
FIG. 17 depicts wedge-shaped signal generation regions.
Figure 18:
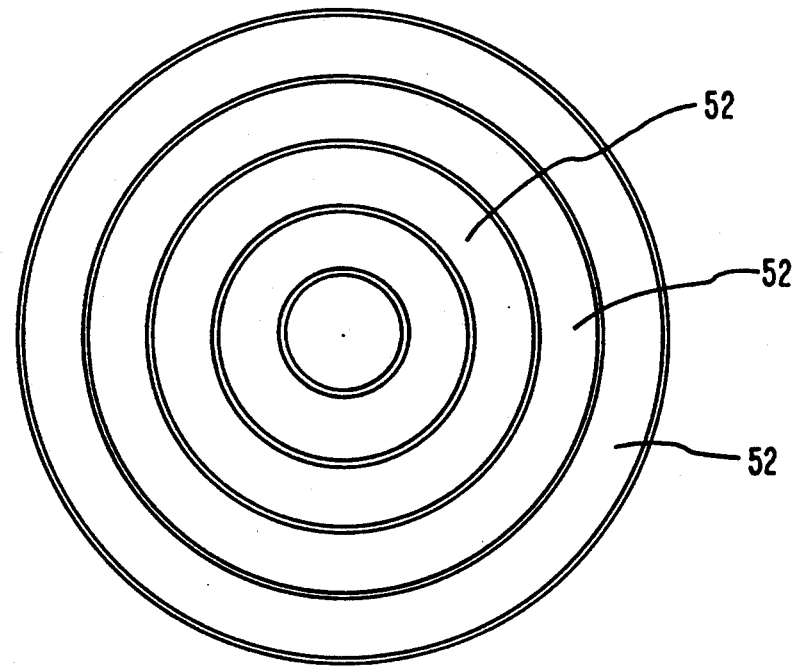
FIG. 18 depicts circular signal reception regions.

The pattern of electrodes 40 have an orthogonal orientation with respect to the pattern of electrodes 24, as shown in FIG. 10. In this embodiment of the invention, signal generation regions 36 have row electrodes 24 and signal reception regions 52 have column electrodes 40. This is one way in which signal generation regions in the form of rows and signal reception regions in the form of columns can be constructed. Other methods of construction are within the scope of this invention. In this embodiment of the invention, the rows are perpendicularly orientated with respect to the columns. In FIG. 10, a signal generation region row 36 and a signal-reception region column 52 perpendicularly overlap each other. This orthogonal overlapping orientation of the signal generation region rows to the signal reception region columns is preferred. However, in other embodiments of the invention the rows and columns may overlap in a nonorthogonal manner (i.e. the rows are not perpendicular to the columns). Although signal generation region rows and signal reception columns are preferred other overlapping patterns can be employed in the practice of this invention. In alternative embodiments of this invention, other overlapping patterns of electrodes can be utilized. For example, FIGS. 15 and 16 show signal generation regions 36 which are not literally perpendicular to signal reception regions 52, because regions 36 are tapered. This arrangement of tapered signal generation regions 36 overlapping signal reception regions 52 can be used, for example, as part of a robotic finger 90 as shown in FIG. 16. FIGS. 17 and 18 depict wedge-shaped signal generation regions 36 and circular signal reception regions 52. The wedge-shaped signal generation regions 36 of FIG. 17 can be overlapped with the circular signal reception regions 52 of FIG. 18 to form the cross-field intersections of an alternative embodiment of this invention.

The overlap of a signal generation region 36 and signal reception region 52 defines or creates a cross-field intersection 53, as shown in FIG. 10 Although the signal generation region and signal reception region don't literally intersect, for the purposes of this disclosure and the appended claims, this overlap defines and is referred to as a cross-field intersection. In FIG. 10 the top region is the signal generation region 36. Alternatively, the positions of signal reception region 52 and signal generation region 36 may be switched.

In this embodiment of the invention, the signal generation rows 36 and signal reception columns 52 overlap to form a plurality of cross-field intersections. By activating a signal generation region row 36 to generate a signal which is transmitted by reflection to a selected signal reception region column 52, and by receiving a detection signal from a signal reception region column 52 for each cross-field intersection 53, the spurious coupling problems of cross-point switching can be avoided.

Figure 11:
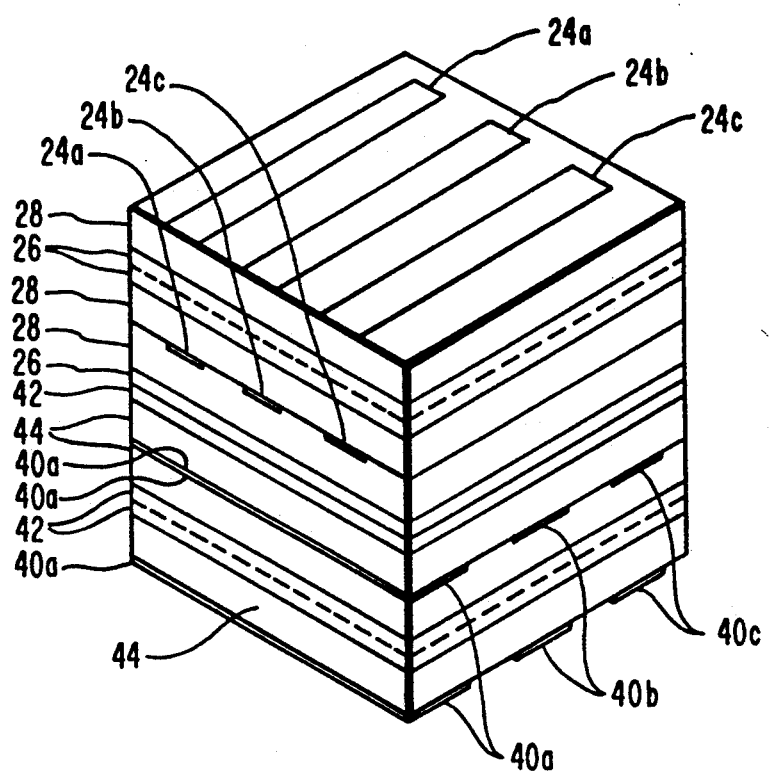
FIG. 11 depicts a folded signal generation sheet stacked on and bonded to a folded signal reception sheet.

The folded signal generation sheet 37, see FIG. 6, and the folded signal reception sheet 39, see FIG. 9, may be bonded to each other as shown in FIG. 11. In this example, the signal generation sheet 37 and signal reception sheet 39 have each been folded twice and bonded together with epoxy adhesive (or any other material capable of adhesion such as urethanes, cyanoacrylates, etc.). The number of folds in the signal generation sheet 37 may vary from the number of folds in the signal reception sheet 39. Accordingly, the number of signal generation strata can be different from the number of signal reception strata. A cross-field intersection is formed (e.g. defined) by the overlap of one or more signal generation regions (e.g. 24a) with one or more signal reception regions (e.g. 40a); however, this overlap now continues through a plurality of strata. In FIG. 11 it is observed that each signal generation stratum has three signal generation regions. In a given signal generation stratum, an electrode 24a together with a piezoelectric layer 28 and an isolation layer 26 form one such signal generation region. The other two signal generation regions in the stratum are similarly formed by electrodes 24b and 24c together with the piezoelectric layer 28 and isolation layer 26 in the stratum. Each signal generation stratum has a set of electrodes 24a, 24b, 24c and a piezoelectric layer 28 and an isolation layer 26. Similarly, it is observed that each signal reception stratum has three signal reception regions. In a given signal reception stratum, an electrode 40a together with a piezoelectric layer 44 and an isolation layer 42 form one such signal reception region. The other two signal reception regions in the stratum are similarly formed by electrodes 40b and 40c together with the piezoelectric layer 44 and isolation layer 42 in the stratum. Each signal reception stratum has a set of electrodes 40a, 40b and 40c and a piezoelectric layer 44 and an isolation layer 42.

In other embodiments, the signal generation strata and the signal reception strata can be interleaved. Interleaving can be accomplished, for example, by the following steps: 1) fold a signal generation sheet once, 2) fold a signal reception sheet once, 3) bond the folded signal generation sheet to the folded signal reception sheet with epoxy adhesive (or any other material capable of adhesion such as urethanes, cyanoacrylates, etc.), and 4) repeat 1 through 3 for multiple interleaved strata. The number of interleaved strata can range from 1 to 20 or more. Preferably about 3 to 6 interleaved strata are used, although the number used in practice can vary depending upon the intended applications and the preferences of the practioner of the invention. Other methods of folding may be used, however, electrodes of the signal generation strata and signal reception strata should not short circuit to ground or to other electrodes.

Figure 12:
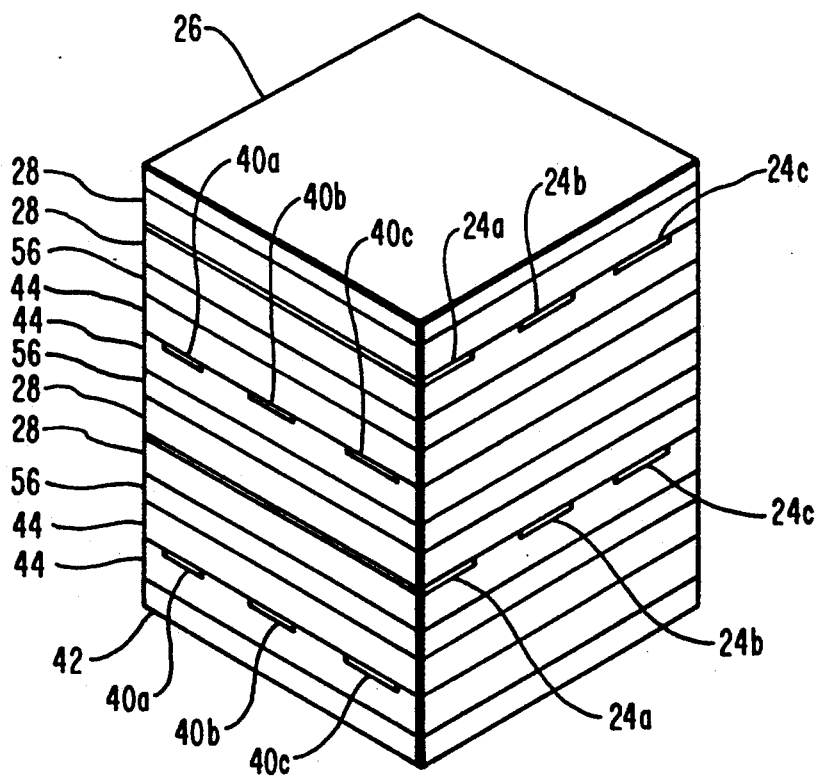
FIG. 12 depicts interleaved signal generation strata and signal reception strata.

FIG. 12 shows interleaved signal generation strata and signal reception strata. The signal generation strata form overlapping electrodes 24a, 24b, and 24c. In other words, electrodes 24a and the signal generation region rows defined by electrodes 24a overlap. The same applies to electrodes 24b (and the rows defined thereby) and electrodes 24c (and the rows defined thereby). Electrodes 24a have a common source to generation control means 18 (i.e. an electrical pulse from generation control means 18 can activate electrodes 24a). Electrodes 24b have a common source to generation control means 18 and electrodes 24c have a common source to generation control means 18. The electrodes 24a, 24b, and 24c, piezoelectric layer 28, and isolation layer 26 or 56 define the signal generation regions.

The signal reception strata form overlapping electrodes 40a, 40b, and 40c. In other words, electrodes 40a and the signal reception region columns defined by 40a overlap. The same applies to electrodes 40b (and the columns defined thereby) and electrodes 40c (and the columns defined thereby). Electrodes 40a have a common source to reception control means 20. Electrodes 40b have a common source to reception control means 20. Electrodes 40c have a common source to reception control means 20. The electrodes 40a, 40b, and 40c, piezoelectric layer 44, and isolation layer 42 or 56 form signal reception regions. Where the folded strata are bonded, an overlapping isolation layer 56 acts as a single, although thicker, isolation layer, because of its common termination. Isolation layer 56 is formed by isolation layers 26 and 42.

The folded and interleaved signal generation strata can generate signals of a greater magnitude. The reception of acoustic signals in the folded and interleaved signal reception strata is more sensitive. Cross-field intersections are defined (i.e. formed) by the overlap of signal generation regions (as defined by electrodes 24a, 24b, and 24c) and signal reception regions (as defined by electrodes 40a, 40b, and 40c). However, this overlap now continues through a plurality of interleaved strata. The order of signal reception strata and signal generation strata can also be switched so that the top signal reception stratum is bonded to the deformable medium 10.

In FIG. 12 it is observed that each signal generation stratum has a set of electrodes 24a, 24b and 24c and a piezoelectric layer 28 and isolation layer 56 or 26. Similarly, it is observed that each signal reception stratum has a set of electrodes 40a, 40b, and 40c and a piezoelectric layer 44 and an isolation layer 56 or 42.

Figure 13:
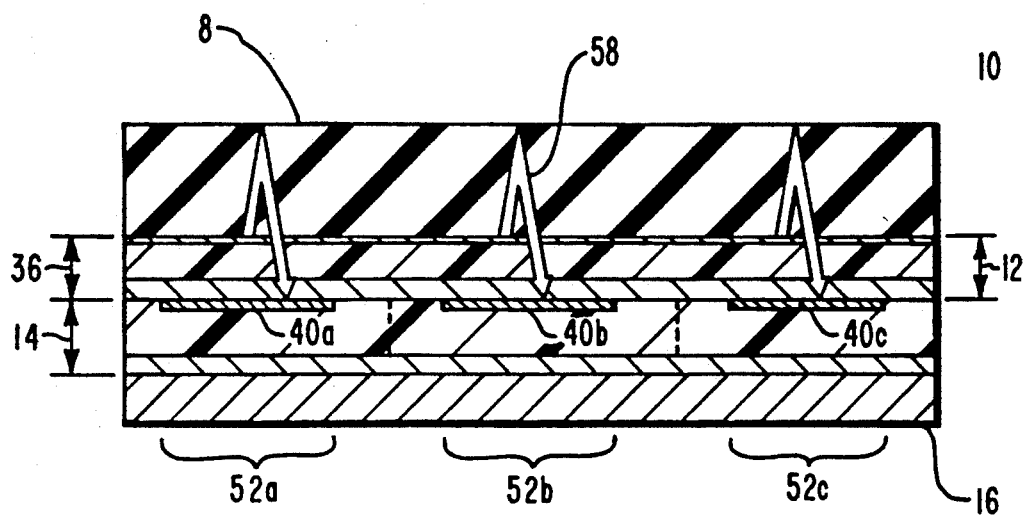
FIG. 13 depicts a cross-sectional view of three cross-field intersections of a force sensor without an applied force.

Preferably, the force sensor includes a substrate 16, which can be any means for supporting the deformable medium 10, the signal generator 12 and the signal receptor 14, as shown in FIGS. 3 and 13. In this embodiment of the invention, the substrate is ceramic (or any other rigid material such as steel, aluminum, etc.) and provides direct support for the signal generator and signal receptor. In other embodiments of the invention, a flexible material such as Kapton can be used.

The force sensor further includes a generation control means 18, as shown in FIG. 3, for selecting and activating signal generation regions. The generation control means 18 can have different configurations. In one configuration, a single pulse generator is connected by switches to the signal generation regions. Once connected, the pulse generator is triggered to produce an electrical pulse which activates the selected signal generation region. In an alternative configuration, each signal generation region is connected to a separate pulse generator. To select and activate the desired signal generation region, the corresponding pulse generator is triggered. Conventional analog and digital circuits can be used for the switches and pulse generators.

The force sensor includes a reception control means 20, FIG. 3, for selecting signal reception regions and for detecting detection signals from selected signal reception regions. The reception control means can also have different configurations. In one configuration, a single detection signal detector is connected by switches to the desired signal reception region. In another configuration, separate detection signal detectors are connected to each signal reception region. To detect the detection signal from the selected signal reception region, the output of the corresponding detection signal detector is selected. Detection can be accomplished with amplitude detection or phase detection circuitry. Conventional analog circuits can be used for the switches and detectors.

The force sensor includes a force determination means 22, see FIG. 3, for determining force components. The transit time of a signal from a signal generation region to a signal reception region can be measured by timing activation and detection. A conventional electronic timer or other means can be used for this purpose. When the signal generation region is activated by the generation control means 18, a timer in the force determination means 22 begins to count. The signal is transmitted to the signal reception region by reflection from contact surface 8. The signal reception region receives the signal and generates a detection signal in response thereto. Detection of the detection signal by the reception control means 20 stops the counter timer. The time interval measured by the timer is equal to the transit time of the signal (which in this embodiment is an acoustic signal). In alternative embodiments, conventional phase detection circuitry can be used to measure the phase of the detection signal, which is related to the transit time of the signal (i.e. the signal generated by the signal generation region). A force determination means can merely determine the signal's transit time. This transit time is proportional to the actual force component and is, therefore, deemed to provide a relative measure of the force component. Furthermore, changes in transit time calculations over a given period of time are proportional to changes in the force component calculations over the same period of time. If desired, the force determination means can further and optionally include a means for calculating the force component.

It should be noted that conventional configurations, circuitry and programming logic can be used or adapted for generation control means 18, reception control means 20 and force determination means 22. Given this disclosure, a person of ordinary skill in the art can readily select, assemble and develop configurations, circuitry and programming logic for the practice of this invention. The necessary knowledge and expertise is well know and does not represent the essence of this invention.

The transit time of a signal is proportional to the distance a signal must travel from the signal generation region 36 to the contact surface 8 of the deformable medium 10 and then to signal reception regions 52a, 52b, and 52c as shown in FIG. 13. Alteration of this distance by a force 62 applied to the deformable medium results in the alteration of the transit time of the signal (60 and 60') to signal reception region 52b, as shown in FIG. 14.

Figure 14:
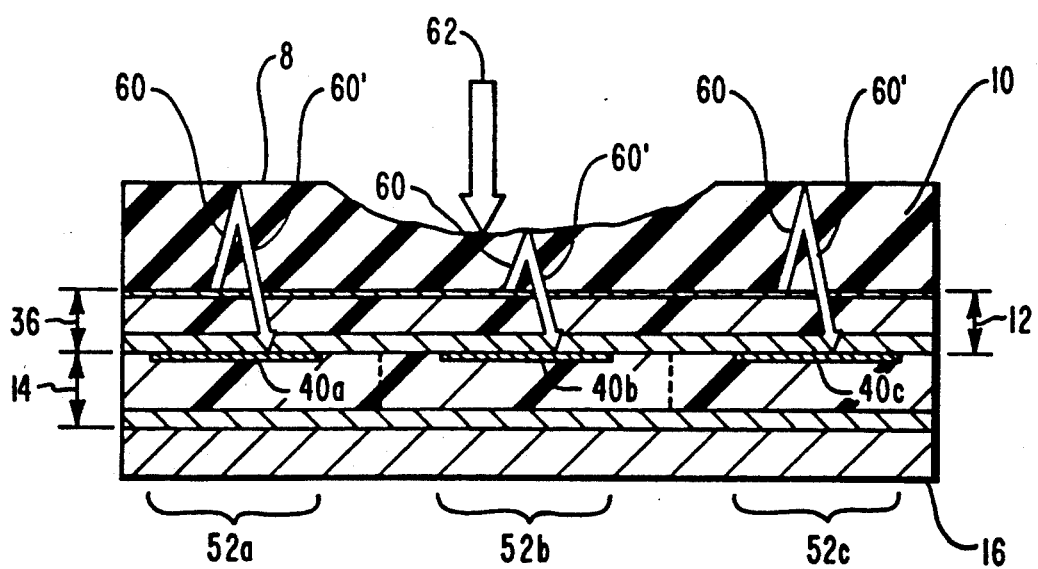
FIG. 14 depicts a cross-sectional view of three cross-field intersections of a force sensor having a force applied to the contact surface of the deformable medium.

FIGS. 13 and 14 show three cross-field intersections formed by the intersection of signal generation region 36 positioned above signal reception regions 52a, 52b, and 52c. The change in the signal transit times produced by an applied force 62 as shown in FIG. 14, can be used by the force determination means to calculate the force component F for a selected cross-field intersection. [Note, that in alternative embodiments of this invention the force determination means may merely measure signal transit time because for many applications this measurement is sufficient and an actual determination of the force component is not necessary.] The sensor is calibrated by measuring and storing the signal transit time for signal 58 for each cross-field intersection when no forces are applied to the contact surface 8 of the deformable medium as shown in FIG. 13. Force component F for a selected cross-field intersection can be determined by:

$$F = \tfrac{1}{2} kc(t_1 - t_2)$$

Coefficients k and c are known constants. Time t is the time for the signal to travel from the signal generation region through the deformable medium and to the signal reception region when there are no applied forces. The speed of sound c in the deformable medium and the medium's elasticity k may be found in reference books, or can be measured experimentally. Time $t_2$, for signal 60 and 60' in FIG. 14, is measured by the force determination means. This measurement can be made repeatedly over time. Force component F is computed for each cross-field intersection using the corresponding value of t stored during sensor calibration and the measured value of $t_2$. If no force is applied to a cross-field intersection when $t_2$ is measured, then $t_2 = t_1$ so that $F = 0$.

When the force sensor is in operation, the generation control means 18 selects a signal generation region (in this embodiment a signal generation row 36) of the signal generator 12. An electrical pulse from the generation control means 18 activates the electrode of the selected signal generation region (row 36). The energized electrode causes the piezoelectric layer to generate an acoustic signal 60, as in FIG. 14. This signal travels through the deformable medium 10 and is reflected back from the contact surface 8. The reflected signal 60' then travels back through the deformable medium 10 to the portions of signal reception regions 52a, 52b, and 52c that are positioned to receive reflected signal 60' as shown in FIG. 14.

The reception control means 20 selects from the signal receptor 14 one signal reception region (column), e.g. 52b to define, in combination with the selected signal generation region 36, a cross-field intersection for which a force component will be calculated. When the signal is reflected off the contact surface 8 of the deformable medium 10, as shown in FIG. 14, it is received by each of the signal reception region columns 52a, 52b, and 52c. The piezoelectric layer in the signal reception regions transforms the reflected acoustic signal 60' into an electrical signal carried by electrodes 40a, 40b, and 40c. This electrical signal is the detection signal. The detection signal carried by the electrode 40b of the selected signal-reception region 52b, is then detected by the reception control means 20. When the detection signal has been detected, the transit time of the signal from the selected signal generation region 36 to the selected signal reception region can be measured by the force determination means by timing activation and detection. Alteration of this distance by a force 62 applied to the deformable medium results in the alteration of the transit time of the signal. The force determination means can then use the transit time $t_2$ to calculate the force component for the selected cross-field intersection as described above.

In this manner each cross-field intersection can be selected in turn and the force component for each selected cross field intersection can be determined (calculated) to determine a pattern or plurality of applied force components over the contact surface 8. This determination gives an indication of the distribution of force components over the contact surface 8. For a typical rubber deformable medium 10 that is an eighth of an inch thick, the transit time of the acoustic signal is from about 4 to 6 microseconds. With current electronics technology, a force measurement can be obtained from each of the cross-field intersections of the force sensor hundreds of times a second for sensors having 256 cross-field intersections. Consequently, applied force components over the contact surface 8 can be repeatedly determined by repeatedly determining the force component for each cross-field intersection. Thus, by repeatedly selecting individual cross-field intersections and determining force components therefor, it is possible to measure force component changes over time.

Thus, the time-sequence of applied force component patterns for a force sensor can be monitored or recorded. The time-sequence of applied force component patterns can be used, for example, to show the changing force distribution on the bottom of the foot as a person walks, or to indicate that a grasped object is slipping from a robot's hand.

The foregoing description of our invention and the drawings so fully reveal the general nature and the innovations and advantages of our invention that others can readily modify such invention and/or adapt it for various applications without departing from its general concepts, and, therefore, such adaptations and modifications should be and are intended to be comprehended within the meaning and range of the claims appended hereto and their equivalents, which claims define subject matter regarded by me to be my invention.

I claim:

1. A force sensor comprising:
   (a) a deformable medium which is deformable in response to a force applied to a contact surface of said deformable medium,
   (b) a signal generator comprising a plurality of signal generation regions,
   (c) generation control means for selecting and activating said signal generation regions,
   (d) a signal receptor comprising a plurality of signal reception regions,
   (e) a reception control means for selecting said signal reception regions and detecting a detection signal from a selected signal reception region, and
   (f) a force determination means;
   wherein:
   (i) a signal generation region is a means for generating a signal which is transmitted to at least one of said signal reception regions by reflection from said contact surface,
   (ii) a signal reception region is a means for receiving a signal which has been generated by and transmitted from at least one of said signal generation regions and reflected from said contact surface, and for generating a detection signal in response to the reception of said reflected signal;
   (iii) activation by (c) of a signal generation region selected by (c) causes said activated signal generation region to generate a signal as provided in (i);
   (iv) (a), (b) and (d) are adapted and positioned with respect to each other such that an application of said force to said contact surface of said deformable medium alters the distance traveled by a signal from at least one of said signal generation regions to at least one of said signal reception regions and, therefore, alters the signal's transit time;
   (v) said signal generation regions overlap with said signal reception regions to form a plurality of cross-field intersections;
   (vi) selection and activation by (c) of a signal generation region and selection by (e) of a signal reception region defines a selected cross-field intersection; and
   (vii) said force determination means is a means for measuring a signal's transit time by timing activation by (c) and detection by (e).

2. A force sensor in accordance with claim 1 wherein said force determination means further comprises a means for determining a force component for a selected cross-field intersection.

3. A force sensor in accordance with claim 1 wherein:
   (viii) said signal generation regions are ultrasonic transducers.

4. A force sensor in accordance with claim 3 wherein:
   (ix) said signal reception regions are ultrasonic transducers.

5. A force sensor in accordance with claim 1 wherein:
   (viii) said signal reception regions are ultrasonic transducers.

6. A force sensor in accordance with claim 1 wherein:
   (viii) the signal referred to in (i), (ii) and (iii) is an acoustic signal.

7. A force sensor in accordance with claim 6 wherein:
   (ix) said signal reception region means for generating a detection signal is a means for transforming the received acoustic signal of (ii) into an electrical signal;
   (x) said electrical signal serves as said detection signal; and
   (xi) said reception control means for detecting a detection signal is a means for detecting said electrical signal.

8. A force sensor in accordance with claim 1 wherein:
   (viii) the signal referred to in (i), (ii) and (iii) is an optical signal.

9. A force sensor in accordance with claim 8 wherein:
   (ix) said signal reception region means for generating a detection signal is a means for transforming the received optical signal of (ii) into an electrical signal;
   (x) said electrical signal serves as said detection signal; and
   (xi) said reception control means for detecting a detection signal is a means for detecting said electrical signal.

10. A force sensor in accordance with claim 1 wherein
    (viii) said signal generation regions are in the form of rows which are substantially parallel to each other; and
    (ix) said signal reception regions are in the form of columns which are substantially parallel to each other.

11. A force sensor in accordance with claim 10 wherein
    (x) said rows are substantially perpendicular to said columns.

12. A force sensor in accordance with claim 1 wherein (viii) a signal generation region is an ultrasonic transducer comprised of a piezoelectric layer positioned between an electrode and an isolation layer.

13. A force sensor in accordance with claim 12 wherein
(ix) a signal reception region is an ultrasonic transducer comprised of a piezoelectric layer positioned between an electrode and an isolation layer.

14. A force sensor in accordance with claim 1 wherein:
(viii) a signal reception region is an ultrasonic transducer comprised of a piezoelectric layer positioned between an electrode and an isolation layer.

15. A force sensor in accordance with claim 1 wherein said signal generator comprises a plurality of signal generation strata each having at least one of said signal generation regions.

16. A force sensor in accordance with claim 1 wherein said signal receptor comprises a plurality of signal reception strata each having at least one of said signal generation regions.

17. A force sensor in accordance with claim 1 wherein cross-field intersections can be selected in turn to determine a plurality of force components over said contact surface.

18. A force sensor in accordance with claim 1 wherein individual cross-field intersections can be repeatedly selected and force components therefor repeatedly determined to measure force component changes over time.

19. A force sensor in accordance with claim 1 wherein:
(viii) said signal generation regions are ultrasonic transducers;
(ix) said signal reception regions are ultrasonic transducers;
(x) the signal referred to in (i), (ii) and (iii) is an acoustic signal;
(xi) said signal reception region means for generating a detection signal is a means for transforming the received acoustic signal of (ii) into an electrical signal;
(xii) said electrical signal serves as said detection signal;
(xiii) said reception control means for detecting a detection signal is a means for detecting said electrical signal;
(xiv) said signal generation regions are in the form of rows which are substantially parallel to each other; and
(xv) said signal reception regions are in the form of columns which are substantially parallel to each other.

20. A force sensor in accordance with claim 19 wherein:
(xvi) cross-field intersections can be selected in turn to determine a plurality of force components over said contact surface; and
(xvii) individual cross-field intersections can be repeatedly selected and force components therefor repeatedly determined to measure force component changes over time.

21. A force sensor in accordance with claim 20 wherein:
(xviii) a signal generation region is an ultrasonic transducer comprised of a piezoelectric layer positioned between an electrode and an isolation layer; and (xix) a signal reception region is an ultrasonic transducer comprised of a piezoelectric layer positioned between an electrode and an isolation layer.

22. A force sensor comprising:
(a) a deformable medium which is deformable in response to a force applied to a contact surface of said deformable medium,
(b) a signal generator comprised of overlapping signal generation strata; wherein a signal generation stratum is comprised of at least one signal generation region,
(c) a generation control means for selecting and activating the signal generation regions of said signal generation strata,
(d) a signal receptor comprised of signal reception strata; wherein a signal reception stratum is comprised of at least one signal reception region,
(e) a reception control means for selecting the signal reception regions of said signal reception strata and for detecting a detection signal from a selected signal reception region, and
(f) a force determination means;
wherein:
(i) a signal generation region is a means for generating a signal which is transmitted to at least one of said signal reception regions by reflection from said contact surface,
(ii) a signal reception region is a means for receiving a signal which has been generated by and transmitted from at least one of said signal generation regions and reflected from said contact surface, and for generating a detection signal in response to the reception of said reflected signal;
(iii) activation by (c) of a signal generation region selected by (c) causes said activated signal generation region to generate a signal as provided in (i);
(iv) (a), (b) and (d) are adapted and positioned with respect to each other such that an application of said force to said contact surface of said deformable medium alters the distance traveled by a signal from at least one of said signal generation regions to at least one of said signal reception regions and, therefore, alters the signal's transit time;
(v) said signal generation regions overlap with said signal reception regions to form a plurality of cross-field intersections;
(vi) selection and activation by (c) of a signal generation region and selection by (e) of a signal reception region defines a selected cross-field intersection; and
(vii) said force determination means is a means for measuring a signal's transit time by timing activation by (c) and detection by (e).

23. A force sensor in accordance with claim 22 wherein said force determination means further comprises a means for determining a force component for a selected cross-field intersection.

24. A force sensor in accordance with claim 22 wherein:
(viii) overlapping signal generation regions are acoustically in series.

25. A force sensor in accordance with claim 22 wherein:
(viii) overlapping signal reception regions are acoustically in series.

26. A force sensor in accordance with claim 22 wherein:

(viii) said signal generation regions are ultrasonic transducers; and
(ix) said signal reception regions are ultrasonic transducers.

27. A force sensor in accordance with claim 26 wherein:
(x) the signal referred to in (i), (ii) and (iii) is an acoustic signal.

28. A force sensor in accordance with claim 27 wherein:
(xi) said signal reception region means for generating a detection signal is a means for transforming the received acoustic signal of (ii) into an electrical signal;
(xii) said electrical signal serves as said detection signal; and
(xiii) said reception control means for detecting a detection signal is a means for detecting said electrical signal.

29. A force sensor in accordance with claim 28 wherein
(xiv) said signal generation regions are in the form of rows which are substantially parallel to each other; and
(xv) said signal reception regions are in the form of columns which are substantially parallel to each other.

30. A force sensor in accordance with claim 29 wherein
(xvi) said rows are substantially perpendicular to said columns.

31. A force sensor in accordance with claim 28 wherein
(xiv) a signal generation region is an ultrasonic transducer comprised of a piezoelectric layer positioned between an electrode and an isolation layer; and
(xv) a signal reception region is an ultrasonic transducer comprised of a piezoelectric layer positioned between an electrode and an isolation layer.

32. A force sensor in accordance with claim 22 wherein cross-field intersections can be selected in turn to determine a plurality of force components over said contact surface.

33. A force sensor in accordance with claim 32 wherein individual cross-field intersections can be repeatedly selected and force components therefor repeatedly determined to measure force component changes over time.

34. A force sensor comprising:
(a) a deformable medium which is deformable in response to a force applied to a contact surface of said deformable medium,
(b) a signal generator comprising at least one signal generation region,
(c) a generation control means for selecting and activating said at least one signal generation region,
(d) a signal receptor comprising at least one signal reception region,
(e) a reception control means for selecting said at least one signal reception region and detecting a detection signal from a selected signal reception region, and
(f) a force determination means;
wherein:
(i) a signal generation region is a means for generating a signal which is transmitted to said at least one signal reception region by reflection from said contact surface,
(ii) a signal reception region is a means for receiving a signal which has been generated by and transmitted from said at least one signal generation region and reflected from said contact surface, and for generating a detection signal in response to the reception of said reflected signal;
(iii) activation by (c) of said at least one signal generation region selected by (c) causes said activated signal generation region to generate a signal as provided in (i);
(iv) (a), (b) and (d) are adapted and positioned with respect to each other such that an application of said force to said contact surface of said deformable medium alters the distance traveled by a signal from said at least one signal generation region to said at least one signal reception region and, therefore, alters the signal's transit time;
(v) said at last one signal generation region overlaps said with at least one signal reception region to form at least one cross-field intersection;
(vi) selection and activation by (c) of said at least one signal generation region and selection by (e) of said at least one signal reception region defines a selected cross-field intersection; and
(vii) said force determination means is a means for measuring a signal's transit time by timing activation by (c) and detection by (e).

35. A force sensor in accordance with claim 34 wherein said force determination means further comprises a means for determining a force component for a selected cross-field intersection.

36. A force sensor in accordance with claim 34, wherein:
(viii) said at least one signal generation region is an ultrasonic transducer that generates an acoustic signal; and
(ix) said at least one signal reception region is an ultrasonic transducer that receives said acoustic signal and generates a detection signal in respoonse thereto.

37. A force sensor in accordance with claim 34 wherein:
(viii) said at least one signal generation region is in the form of a row, and (ix) said at least one signal generation region is in the form of a column.

38. A force sensor in accordance with claim 34 wherein said at least one cross-field intersection can be repeatedly selected and force components therefor repeatedly determined to measure force component changes over time.

39. A force sensor in accordance with claim 34 wherein said at least one signal generation region is tapered.

40. A force sensor in accordance with claim 34 wherein said at least one signal generation region is wedge-shaped.

41. A force sensor in accordance with claim 34 wherein said at least one signal reception region is circular.

42. A force sensor in accordance with claim 34 wherein said at least one signal generation region is circular.

43. A method for determining force components of a force applied to a contact surface of a deformable medium, said method comprising:
(a) selection of a signal generation region by a generation control means and selection of a signal reception region by a reception control means, thereby defining a selected cross-field intersection;

(b) activation by said generation control means of said selected generation control means to generate a signal, (c) transmitting said signal from said signal generation region to said signal reception region by reflection from the contact surface, whereby said signal reception region receives said signal, (d) generation by said signal reception region of a detection signal in response to the reception by said signal reception region of the signal generated in (b), (e) detection of said detection signal by said reception control means, and (f) determining said signal's transit time by timing activation in (b) and detection in (e).

44. A method in accordance with claim 43 further comprising:

(g) determining a force component for said selected cross-field intersection based on said transit time.

45. A method in accordance with claim 44 wherein (a) to (g) are repeated for a plurality of different cross-field intersections to determine a plurality of force components over said contact surface.

46. A method in accordance with claim 44 wherein (a) to (g) are repeated for individual cross-field intersections to measure force component changes over time.

* * * * *